United States Patent [19]

Cleveland

[11] Patent Number: 4,734,987
[45] Date of Patent: Apr. 5, 1988

[54] MOVING NODE WAVE ISOLATOR FOR DRAFTING PLOTTERS

[75] Inventor: Lance Cleveland, Davis, Calif.

[73] Assignee: Hewlett-Packard Company, Palo Alto, Calif.

[21] Appl. No.: 19,409

[22] Filed: Feb. 26, 1987

[51] Int. Cl.$^4$ .................... B43L 13/00; G01D 15/28
[52] U.S. Cl. .................................... 33/18.1; 33/32.4; 33/32.7; 346/136
[58] Field of Search ............... 33/18.1, 18.2, 26, 32.4, 33/32.7; 346/136

[56] References Cited

U.S. PATENT DOCUMENTS

| | | | |
|---|---|---|---|
| 4,234,886 | 11/1980 | Alden et al. | 346/136 |
| 4,467,525 | 8/1984 | Logan et al. | 33/18.2 |
| 4,547,968 | 10/1985 | Petersen | 33/32.7 |
| 4,630,071 | 12/1986 | Nakazawa | 346/136 |
| 4,665,619 | 5/1987 | Pearl | 33/32.4 |

FOREIGN PATENT DOCUMENTS 3522426 1/1986 Fed. Rep. of Germany ....... 33/18.1

*Primary Examiner*—Richard R. Stearns
*Attorney, Agent, or Firm*—William J. Bethurum

[57] ABSTRACT

A wave isolator (18) is provided for large format drafting plotters (10) for preventing waves in the drafting medium (16) from traveling up the platen (14) and adversely affecting the pen (20) and its operation and reducing acceleration related vertical scalloping of angled lines. Such waves in the medium are generated by the motion of the paper during the plotting operation. The wave isolator comprises at least one strip (22a) of flexible material secured to the platen and of substantially the same length. Preferably, a polyimide film is used, having a coating of a thermoset acrylic resin with additives including conductive carbon black and polyethylene. In operation, when the medium is moving upward, the wave isolator deflects under the increased inertial load, and air trapped between the medium and the platen exits at the sides of the medium, dissipating some of its energy. When the medium is moving downward, the wave isolator sees a negative change in load and responds by flexing upward, tending to increase the volume of air between the medium and the platen, creating a low pressure area which sucks air in at the sides of the medium, again dissipating its energy. Use of the wave isolator of the invention permits high speed, high acceleration plotting on both sheet and roll media without the aid of firmware solutions.

36 Claims, 4 Drawing Sheets even vector is made and the middle is not actually known of the medium. The strips 22a, 22b, 22c are preferably attached to the chassis 12 by adhesive, although other means, such as screw fasteners, may alternatively be employed.

MOVING NODE WAVE ISOLATOR FOR DRAFTING PLOTTERS

TECHNICAL FIELD

The present application relates to large format drafting plotters, and, more particularly, to isolating dynamic media waves on the plotting medium that interfere with the pen.

BACKGROUND ART

One problem faced by designers of grit wheel technology plotters is the prevention of the dynamics of the moving medium (paper, mylar, vellum, etc.) from hindering the writing quality of the plot. This problem has two manifestations, which the invention described herein solves.

The first problem is the formation of waves in the medium, which travel up the platen and interfere with the pen. These waves are large enough to lift the pen from the medium or even strike the pen while it is in the penup position. These phenomona are known, respectively, as the skip and the drag.

The second problem is the scalloping of lines drawn on an angle (angled vectors) during high acceleration. Since the medium is being driven only by its edges parallel to the direction of motion, the center of the medium tends to lag until constant velocity is reached. Although this is only slightly noticeable on vectors longer than 15 mm, it is glaringly obvious on shorter vectors, especially those used to generate characters.

One solution used in response to the medium wave problem is a firmware filter. This filter looks at incoming vectors, and based on an algorithm which is a function of velocity, acceleration, move length, and move direction, slows the plotter down to twice the acceleration of gravity (2 g) from a maximum of 4 g. This solution increases plot time by an average of 10% for typical demonstration plots. This average, however, does not indicate an even distribution. Rather, some plots are clustered around 5% and others around 20%. In the worst case, plot time may be increased by 40%. High throughput in both sheet and roll mode is seriously compromised if much of the plot time is spent at 2 g.

The scalloping problem has also received a firmware fix. Here, the solution consists of pulsing the acceleration on angled vectors so that the pen is actually ahead of its intended position. Consequently, the pen does not compensate enough in the middle of the sheet and overcompensates near the edges under the pinch rollers. This transforms line quality from poor in the center and perfect at the edges to consistently poor everywhere, but marginally passable.

Thus, there is a need to provide a means for simultaneously isolating the moving waves and preventing scalloping of angled vectors during high acceleration.

DISCLOSURE OF INVENTION

In accordance with the invention, a moving node wave isolator is provided for preventing waves, generated in the medium during plotting, from travelling up the platen and interfering with the pen. The wave isolator comprises a thin flexible cantilevered beam having a length substantially the same as that of the plotter chassis and a mass negligible in comparison with that of the medium. In one embodiment, the cantilevered beam is leafed preferably obtained by layering three strips of flexible film, attached along the length of the chassis.

The first and major advantage of the invention is that the moving node wave isolator allows for high speed, high acceleration on both sheet and roll media without the aid of firmware "fixes". The device of the invention has been tested up to 6 g acceleration, where it achieved a 97% reduction in the number of drags for roll media and an 88% reduction in the number of drags for sheet media, compared to presently available commercial plotters.

BEST MODE FOR CARRYING OUT THE INVENTION

Figure 1:
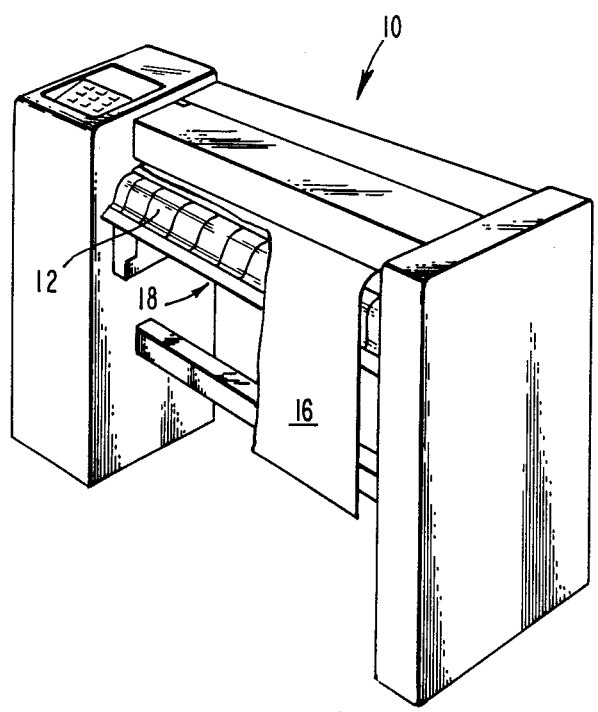
FIG. 1 is a perspective view of a large format drafting plotter, utilizing the moving node wave isolator of the invention.

Referring now to the drawings wherein like numerals of reference designate like elements throughout, a large format drafting plotter is depicted generally at 10. The drafting plotter includes the usual elements of a carriage for supporting a pen, a motor for driving the carriage bidirectionally and orthogonal to the direction of the plotting medium, a carosel or turret for storing a quantity of pens for plotting, means for rotating the turret to select a particular pen, and a microprocessor for controlling these elements. Such elements are commonly known for such plotters and are not shown herein.

Additional elements of such plotters germane to the following discussion include a chassis 12 and platen 14 for supporting a medium 16 upon which a plot is made.

In accordance with the invention, an isolator 18 keeps waves from reaching the pen 20. As mentioned earlier, such waves are generated in the medium 16 during the plotting operation, and travel up the chassis, where they adversely affect the plotting operation. By preventing the waves from traveling up the chassis 12, the isolator 18 acts as a mechanical wave absorber.

The isolator 18 of the invention comprises a beveled or leafed cantilever, which is preferably approximated by use of three layers, or strips, 22a, 22b and 22c. The layers comprise thin strips of flexible thermoplastic material. An example of a preferred material is a polyimide film, such as that available from E. I. duPont de Nemours, Inc. (Wilmington, Del.) under the tradename "Kapton".

Figure 4:
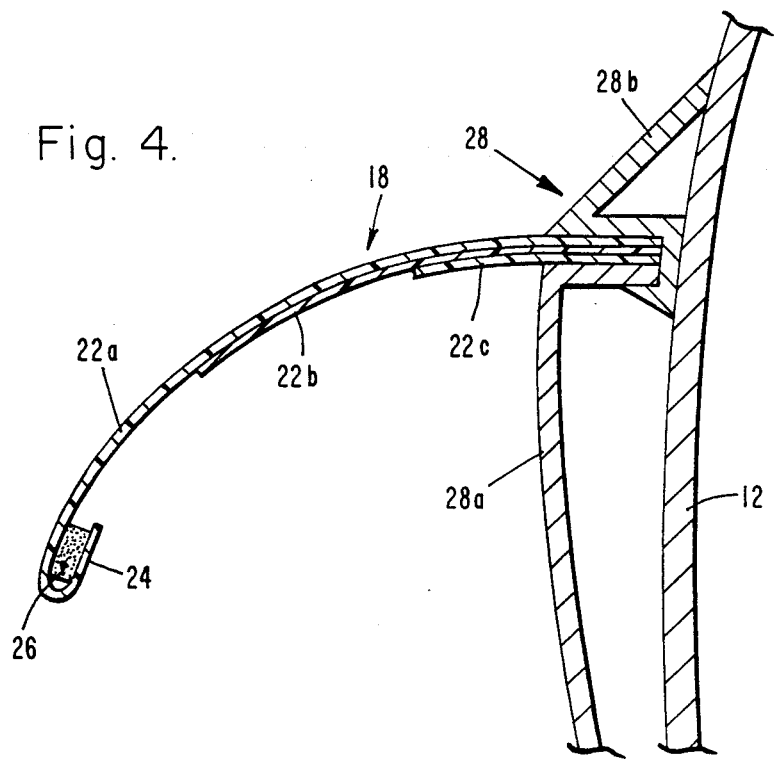
FIG. 4 is a cross-sectional view of a preferred embodiment of the wave isolator of the invention.

The strips 22a, 22b, 22c are of three different widths, arranged so that the widest is on top and the narrowest in on the bottom. The strips adhere to one another only along the edge which is attached to the plotter (FIG. 4). This allows the strips to slip relative to one another during bending, supporting no shear load between layers, making the composite plate more compliant than a single strip of similar geometry. On the other hand, bonding the three layers together at the common edge which attaches to the plotter provides a thicker base to withstand the effects of bending loads over time, known as creep. These variables (width, thickness and number of layers) allow the frequency response bandwidth of the composite strip to be tuned to be effective over the various input frequencies of dynamically induced media waves, and at the same time satisfy static load requirements over time.

The three layers are all of substantially the same length, running the length of the chassis 12. In one example, the top layer 22a is about 1018 mm long, while the other two layers 22b, 22c are each about 1005 mm long. The top layer is formed to the same length as the chassis 12, while the other layers are somewhat shorter to allow for assembly tolerances.

The composite approximates a tapered plate, but will be less stiff due to no shear stress between layers. The relationship of the widths w preferably ranges from about 3w:2w:w to 4w:2w:w. If all layers were the same width, the bottom layers would curl away from the top layer, providing no support, and posing a risk of the operator being cut by the edge of the film.

As an example, the top layer 22a is 4 mils thick and about 3 1/16 inches wide, with a hem 24 formed by folding the free edge over a length of double sided foam tape 26, ¼ inch wide and ⅛ inch thick. In presenting a rounded edge, the hem 24 prevents the operator from cuts on the thin film, provides stability of the top layer 22a by making the edge rigid, and adds a finished cosmetic appearance to the isolator 18. The other two layers 22b, 22c are 3 mils thick and are 2 inches and 1 inch, respectively, in width.

Layer 22a most preferably comprises Kapton 400H or 400HN, coated with a thin (about 0.2 mils) film of a thermoset acrylic resin with additives, including conductive carbon black and polyethylene. The coating provides wear resistance, a low coefficient of friction, and bleeds off static charge caused by the movement of the medium 16. The coating is readily applied in the liquid form to the top layer 22a, such as by dipping, spraying or coating with a slot head coater in which the coating is "extruded" onto the thin film.

Layers 22b and 22c most preferably comprise Kapton 300HN, and are not coated. These layers are not visible, but act as stiffening members to approximate a beveled cantilever beam, as mentioned above.

The wave isolator 18 is mounted on both the front and rear of chassis 12 by an isolator clamp and cap assembly 28, comprising an isolator clamp 28a and a cap 28b. The isolator clamp 28a is retained on chassis strut 12a by a bottom plate 30 which is attached to the chassis strut by a nut and stud assembly 13. The clamp 28a positions the isolator 18 vertically a distance from the bottom of the chassis 12. For the chassis of the particular plotter depicted herein, the optimal distance is about 70 mm.

The cap 28b provides a transition for the edge of the medium 16, as it moves back and forth over the intersection of the isolator 18 and the chassis 12. The cap 28b also provides a cosmetic cover for this intersection and prevents the isolator 18 from being easily stripped away from the clamp 28a.

Figure 5:
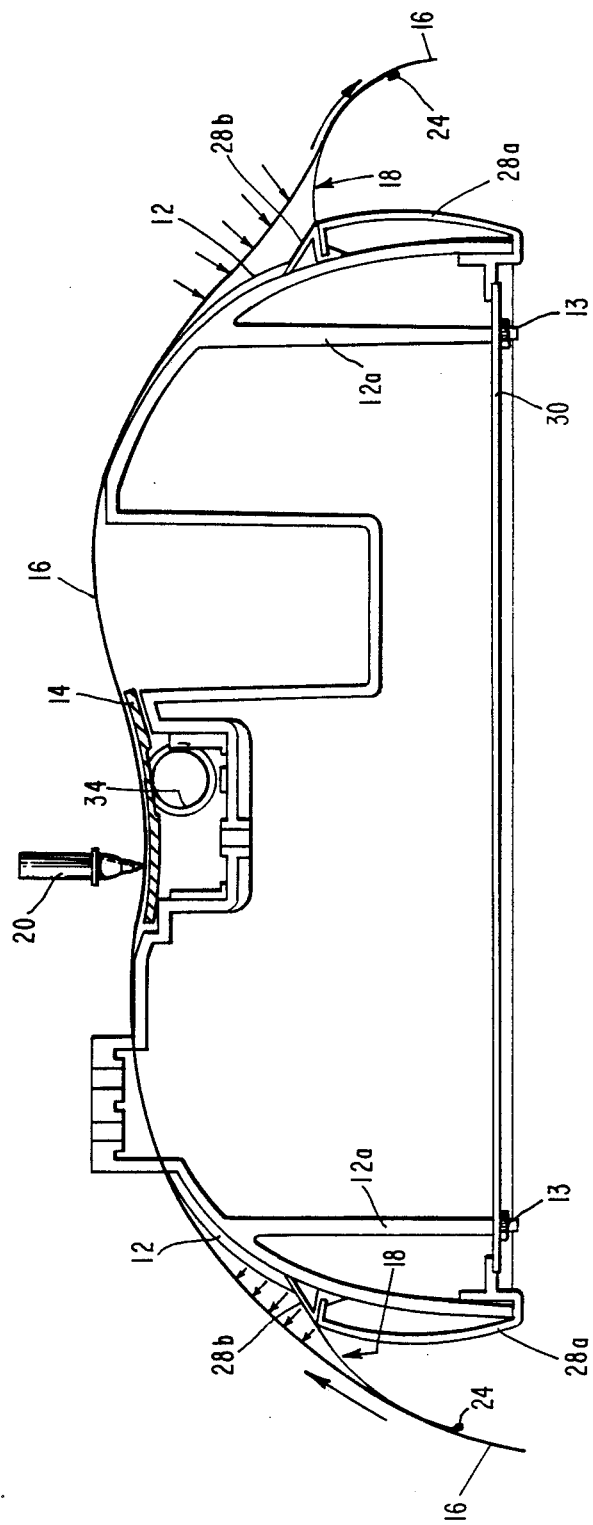
FIG. 5 is a cross-sectional view of the chassis of the plotter of FIG. 1, supporting a plotting medium thereon, showing the effect of the motion of the plotting medium on the wave isolator of the invention.

The first principle of operation is that a moving node, provided by the wave isolator 18 of the invention, at the edge of the plotter 10 will reflect dynamic waves in the medium 16 and not allow them to travel up the platen 14. This essentially acts as a mechanical filter, which allows only high frequency, small amplitude waves to pass. The waves that do pass are small enough to be eliminated by the vacuum force holding the medium 16 to the platen surface. As seen in FIG. 5, the wave isolator 18 holds the medium 16 away from the chassis 12, forming a volume of air between the medium and the platen. This air gap acts as a damper, pumping air in and out as the wave isolator 18 of the invention reacts to the moving medium 16.

Figure 6:
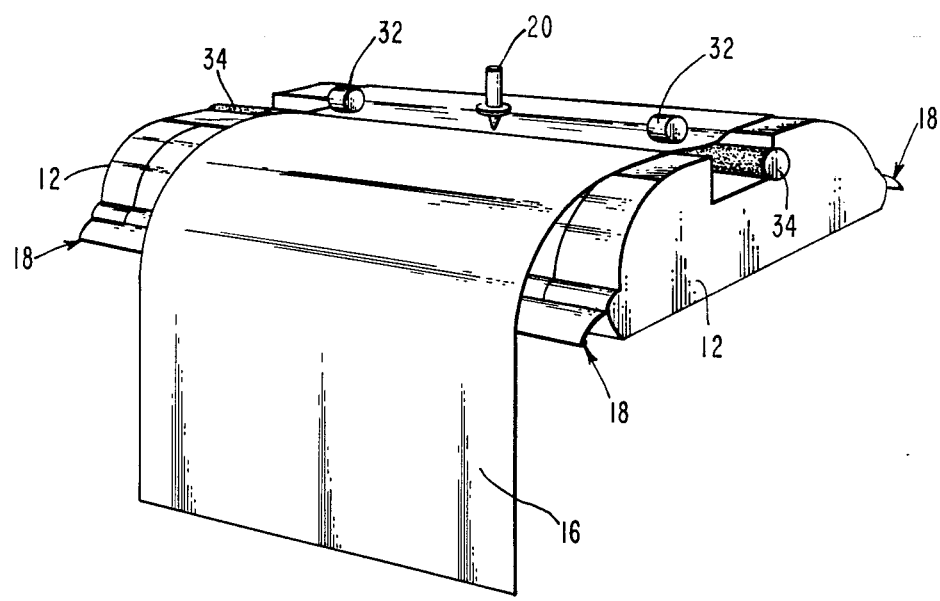
FIG. 6 is a perspective view of a portion of a drafting plotter, showing schematically the relationship of various components.

The second principle of operation of the invention relies on the fact that the medium 16 is supported by the isolator 18, which allows for movement of the medium 16 normal to the plane of the medium. This is important, since it reduces the inertial load of the free-hanging medium on that portion which is under the pen 20 (as shown in FIG. 6). This inertial load is manifested as bowing of angled lines, and is particularly noticeable when these lines are drawn at the top center or bottom center of the medium 16. This effect is pronounced in the rendering of alpha-numeric characters where curved portions will appear scalloped.

To understand how this works, consider FIG. 6, which depicts the plotter chassis 12 with medium 16 held in place by pinch wheels 32 bearing down on a grit covered shaft 34. The platen 14, clamp 28a and cap 28b are not shown for simplicity. The carriage which holds the pen 20 and the brackets which supply force on the pinch wheels 32 are also not shown. The medium 16 is driven by the grit shaft 34; however, the medium is pinched onto the grit shaft only at its edges, that is, directly beneath the pinch wheels 32. The fact that the rest of the medium moves at all is due to the stiffness of the medium itself. It may be appreciated that if the medium 16 were a very compliant material, for example, a wet beach towel, the center of the medium 16 in the vicinity of the pen 20 would lag behind the two edges directly beneath the pinch wheels 32.

Since the medium 16 used in plotters is not a wet beach towel, but is in fact paper, vellum or drafting film, then the inertia forces, while not as great as those of a wet beach towel, will still cause the center of the medium to lag behind the edges during acceleration. The function of the isolator 18 of the invention is to isolate the free-hanging mass of the medium 16 (that is, that portion of the medium which hangs below the isolator) from that which lies between the front and rear isolators.

As shown in FIG. 5, when the medium 16 is accelerated up over the isolator 18 (as at the rear in FIG. 5), it deflects the isolator down. Thus, some of the acceleration originally input at the grit shaft 34 and pinch wheels 32 has gone into moving the isolator 18 rather than trying to move all the medium 16 up over the chassis 12. Therefore, the center of the medium 16 in the vicinity of the pen 20 will move more closely in accord with the edges under the pinch wheels 32. This function of the isolator 18 has been shown to reduce the inertial lag effect by a factor of about three.

The wave isolator effect may be created one of two ways: active or passive. The active approach requires an electronically controlled motor which would drive a rigid isolator in the direction of medium motion during acceleration of the medium and then return to a neutral position during constant velocity motion of the medium. This would require an additional motor, controlling firmware, and several moving parts to be effective. Cost constraints thus role out the active approach.

Figure 2:
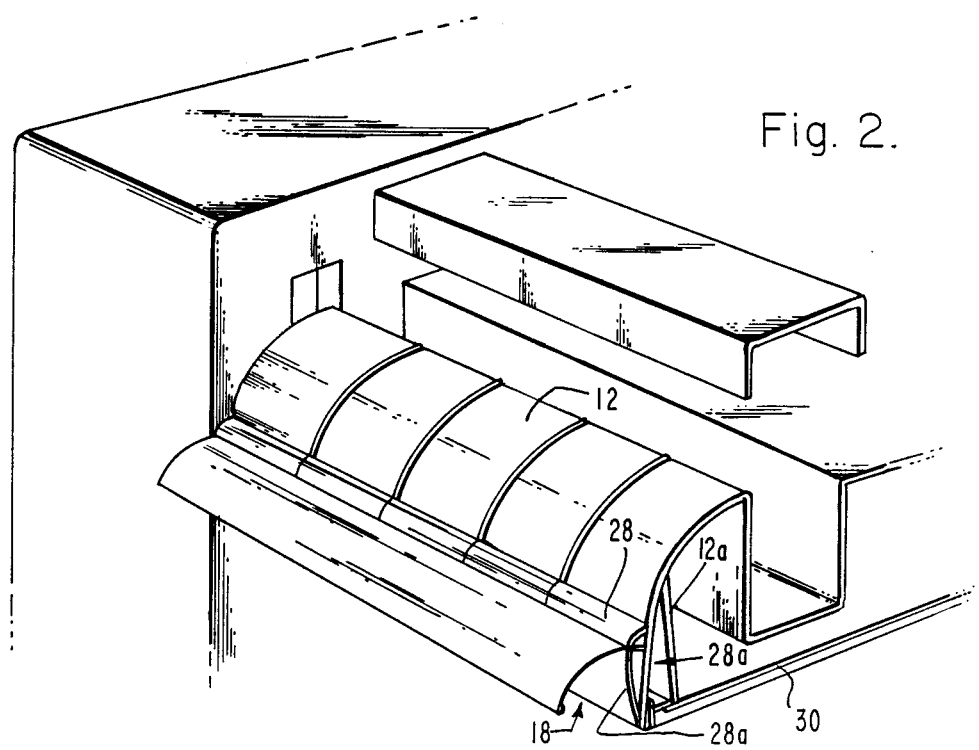
FIG. 2 is a perspective view of a portion of the drafting plotter of FIG. 1, shown partially in section, and depicting the relationship of the wave isolator to the platen of the plotter.
Figure 3:
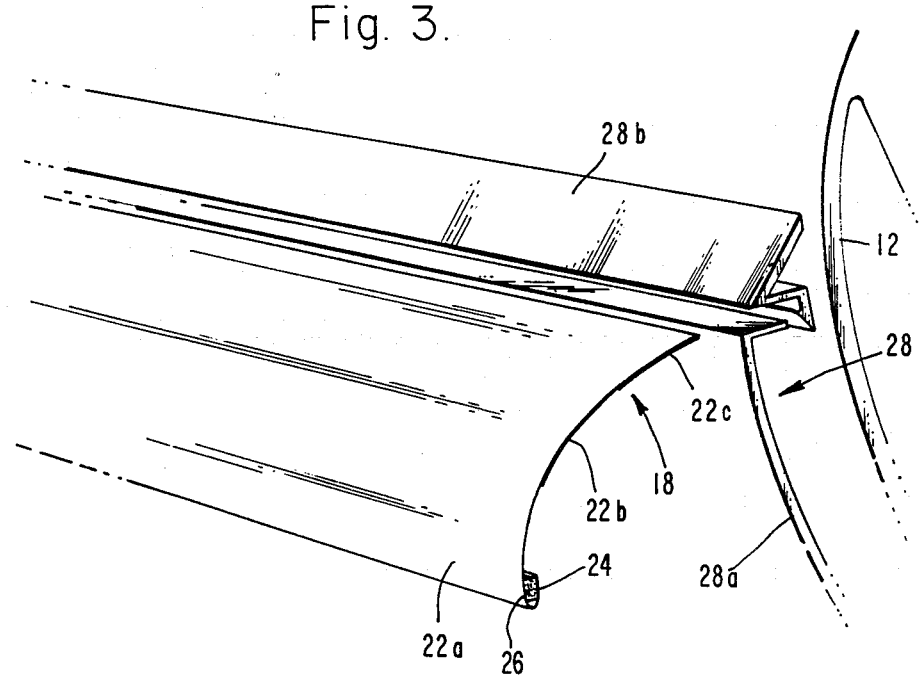
FIG. 3 is a detail of a portion of FIG. 2.

The passive approach has two options. The wave isolator 18 may be externally sprung, or it may rely on its own internal spring rate to supply the needed frequency response. The internal spring rate isolator (the device of choice) is shown in FIGS. 2-4. What makes the internal spring rate approach so attractive is that it has a variable frequency response and practically no mass. Because the flexible strip 22a itself has very little mass, the frequency response is largely determined by the mass of the medium 16 draped over it. This allows the wave isolator 18 to respond to any frequency capable of being generated in the medium 14.

FIG. 2 depicts a cross-section of a drafting plotter chassis with wave isolators 18 along its front and rear edges. The wave isolators 18 extend the entire length of the chassis.

When medium 16 is mounted in the plotter 10, the wave isolator 18 will deflect as shown in FIG. 5. When the medium 16 is accelerated, several things happen. First, the wave isolator 18 which sees the medium accelerating upward (left side of FIG. 5) will deflect under the increased inertial load. At the same time, air trapped between the medium 16 and the chassis 12 exits at the sides of the medium, dissipating some of the energy of the medium. Meanwhile, at the front of the plotter 10 where the medium 16 is accelerating downward, the wave isolator 18 sees a negative change in load and responds by flexing upward. This tends to increase the volume of air between the medium 16 and the chassis 12, creating a low pressure area which sucks air in at the sides, again dissipating the medium's energy.

As the mass of the medium 16 hanging off the edge of the wave isolator 18 changes (due to pen position on the medium), the amount of deflection changes. Thus, when less medium 16 is supported by the wave isolator 18, it will have a higher natural frequency. Since the medium mass is smaller, the input wave frequency of the free medium matches the resonant frequency of the isolator 18. Conversely, when medium mass is greater, the system will have a lower natural frequency. However, since the same mass which produced the lower natural frequency governs the input frequency to the wave isolator 18, the flexible strip 22a will again respond to the input caused by medium acceleration. Indeed, because the flexible strip 22a is nearly massless, the wave isolator 18 as a system has nearly zero lag. Thus, it will always be able to respond to any frequency caused by a combination of acceleration, velocity, and move length. This forms a moving node which tracks the medium 16 and reflects dynamic medium waves.

INDUSTRIAL APPLICABILITY

The moving node wave isolator 18 is expected to find use in large format drafting plotters 10. Further, the configuration of the wave isolater permits retrofit of existing plotters, thereby permitting its use in existing plotters as well as prospective plotters in preventing wave motion of the medium from adversely affecting the pen and its operation.

A moving node wave isolator for preventing wave motion of the medium in a large format drafting plotter from adversely affecting the pen and its operation has been disclosed. It will be appreciated that many changes and modifications of an obvious nature may be made without departing from the spirit and scope of the invention, and all such changes and modifications are considered to fall within the scope of the invention, as defined by the appended claims.

What is claimed is:

1. A moving node wave isolator for use in a drafting plotter including a chassis having front and rear portions and a platen for supporting a medium and a plotting pen, said plotting pen and said medium each adapted to move bidirectionally, one orthogonal to the other, said isolator comprising a flexible cantilever beam having a length substantially the same as that of said chassis and a mass negligible in comparison with that of said medium draped over said isolator, means for mounting said wave isolator on one of said front and rear portions of said chassis, said wave isolator thereby preventing motion of said medium from adversely affecting said plotting pen and its operation.

2. The wave isolator of claim 1 wherein said cantilever beam is leafed.

3. The wave isolator of claim 2 wherein said cantilever beam comprises a plurality of strips approximating a leafed cantilever beam.

4. The wave isolator of claim 3 comprising a top strip having a first width, a middle strip having a second width, and a bottom strip having a third width.

5. The wave isolator of claim 4 wherein the ratio of said first width to said second width to said third width ranges from about 3:2:1 to about 4:2:1.

6. The wave isolator of claim 4 wherein said top strip is provided with a hem portion.

7. The wave isolator of claim 6 wherein said top strip is about 4 mils thick and said middle and bottom strips are each 3 mils thick and wherein said top strip is further provided with said hem portion along one edge comprising a foam strip.

8. The wave isolator of claim 7 wherein said foam strip is about ¼ inch wide and about ⅛ inch thick.

9. The wave isolator of claim 7 wherein said strips comprise a polyimide material.

10. The wave isolator of claim 9 wherein said top strip has a coating thereon of a thermoset acrylic resin containing additives including conductive carbon black and polyethylene.

11. The wave isolator of claim 1 wherein said mounting means mounts one of said wave isolators on each of said front and rear portions, with both of said wave isolators coacting with said medium, thereby preventing motion of said medium from adversely affecting said plotting pen and its operation.

12. A moving node wave isolator for use in a large format drafting plotter including a chassis having front and rear portions and a platen for supporting said medium and a plotting pen, said plotting pen and said medium each adapted to move bidirectionally, one orthogonal to the other, said isolator comprising a top strip having a first width, a middle strip having a second width, and a bottom strip having a third width, means for mounting one of said wave isolators on each of said front and rear portions of said chassis, both of said wave isolators thereby preventing motion of said medium from adversely affecting said plotting pen and its operation.

13. The wave isolator of claim 12 wherein said top strip is provided with a hem portion.

14. The wave isolator of claim 13 wherein said top strip is about 4 mils thick and said middle and bottom strips are each 3 mils thick and wherein said top strip is further provided with said hem portion along one edge comprising a foam strip.

15. The wave isolator of claim 14 wherein said foam strip is about ¼ inch wide and about ⅛ inch thick.

16. The wave isolator of claim 14 wherein said strips comprise a polyimide material.

17. The wave isolator of claim 16 wherein said top strip has a coating thereon of a thermoset acrylic resin containing additives including conductive carbon black and polyethylene.

18. The wave isolator of claim 13 wherein the ratio of said first width to said second width to said third width ranges from about 3:2:1 to about 4:2:1.

19. In combination, a drafting plotter including a chassis having front and rear portions and a platen for supporting a medium and a plotting pen, said plotting pen and said medium each adapted to move bidirectionally, one orthogonal to the other, and a moving node wave isolator, said isolator comprising a flexible cantilever beam having a length substantially the same as that of said chassis and a mass negligible in comparison with that of said medium, draped over said isolator, means for mounting said wave isolator on one of said front and rear portions of said chassis, said wave isolator thereby preventing motion of said medium from adversely affecting said plotting pen and its operation.

20. The combination of claim 19 wherein said mounting means mounts one of said wave isolators on each of said front and rear portions, with both of said wave isolators coacting with said medium, thereby preventing motion of said medium from adversely affecting said plotting pen and its operation.

21. The combination of claim 19 wherein said cantilever beam is leafed.

22. The combination of claim 21 wherein said cantilever beam comprises a plurality of strips approximating a leafed cantilever beam.

23. The combination of claim 22 comprising a top strip having a first width, a middle strip having a second width, and a bottom strip having a third width.

24. The combination of claim 23 wherein the ratio of said first width to said second width to said third width ranges from about 3:2:1 to about 4:2:1.

25. The combination of claim 23 wherein said top strip is provided with a hem portion.

26. The combination of claim 25 wherein said top strip is about 4 mils thick and said middle and bottom strips are each 3 mils thick and wherein said top strip is further provided with said hem portion along one edge comprising a foam strip.

27. The combination of claim 26 wherein said foam strip is about ¼ inch wide and about ⅛ inch thick.

28. The combination of claim 26 wherein said strips comprise a polyimide material.

29. The combination of claim 28 wherein said top strip has a coating thereon of a thermoset acrylic resin containing additives including conductive carbon black and polyethylene.

30. In combination, a large format drafting plotter including a chassis having front and rear portions and a platen for supporting said medium and a plotting pen, said plotting pen and said medium each adapted to move bidirectionally, one orthogonal to the other, and a moving node wave isolator, said isolator comprising a top strip having a first width, a middle strip having a second width, and a bottom strip having a third width, means for mounting one of said wave isolators on each of said front and rear portions of said chassis, both of said wave isolators thereby preventing motion of said medium from adversely affecting said plotting pen and its operation.

31. The combination of claim 30 wherein said top strip is provided with a hem portion.

32. The combination of claim 31 wherein said top strip is about 4 mils thick and said middle and bottom strips are each 3 mils thick and wherein said top strip is further provided with said hem portion along one edge comprising a foam strip.

33. The combination of claim 32 wherein said foam strip is about ¼ inch wide and about ⅛ inch thick.

34. The combination of claim 32 wherein said strips comprise a polyimide material.

35. The combination of claim 34 wherein said top strip has a coating thereon of a thermoset acrylic resin containing additives including conductive carbon black and polyethylene.

36. The combination of claim 30 wherein the ratio of said first width to said second width to said third width ranges from about 3:2:1 to about 4:2:1.

* * * * *